US010960865B2

(12) United States Patent
Feigel

(10) Patent No.: US 10,960,865 B2
(45) Date of Patent: Mar. 30, 2021

(54) ACTUATOR ASSEMBLY FOR INTEGRATED DYNAMIC BRAKE APPARATUS

(71) Applicant: MANDO CORPORATION, Gyeonggi-do (KR)

(72) Inventor: Hansjoerg Feigel, Seoul (KR)

(73) Assignee: MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 15/643,203

(22) Filed: Jul. 6, 2017

(65) Prior Publication Data
US 2018/0009425 A1    Jan. 11, 2018

(30) Foreign Application Priority Data

Jul. 6, 2016  (KR) .................. 10-2016-0085691

(51) Int. Cl.
*F16H 25/22*    (2006.01)
*B60T 13/74*    (2006.01)
(Continued)

(52) U.S. Cl.
CPC ............ *B60T 13/745* (2013.01); *B60T 8/368* (2013.01); *B60T 13/145* (2013.01);
(Continued)

(58) Field of Classification Search
CPC .... B60T 13/145; B60T 8/4022; B60T 8/4086; B60T 13/745; B60T 13/142;
(Continued)

(56) References Cited

U.S. PATENT DOCUMENTS 5,454,631 A * 10/1995 Frieling .................. B60T 8/489
                                                                303/113.2
6,056,090 A *  5/2000 Reimann ............... B60T 13/741
                                                                188/156
(Continued)

FOREIGN PATENT DOCUMENTS

CN    1633373     6/2005
CN    103717936   4/2014
(Continued)

OTHER PUBLICATIONS

Office Action dated Jun. 21, 2019 for Chinese Patent Application No. 201710547054.3 and its English translation from Global Dossier.

*Primary Examiner* — Jake Cook
*Assistant Examiner* — Gregory Robert Weber
(74) *Attorney, Agent, or Firm* — Ladas & Parry, LLP

(57) ABSTRACT

An actuator assembly for an integrated dynamic brake apparatus according to an embodiment of the present invention includes a hollow motor having a stator and a rotor spaced apart from an inner circumferential surface of the stator; a block having one side coupled to one side of the motor and in which chamber that accommodates fluid is formed; a gear unit having one side coupled and fixed to the rotor to convert rotational movement of the rotor to linear movement; a piston configured to receive the converted linear movement from the gear unit to linearly reciprocate; and an electronic control unit coupled to the other side of the block and comprising a motor position sensor configured to detect a position of the motor.

17 Claims, 4 Drawing Sheets

(51) Int. Cl.
*B60T 8/36* (2006.01)
*B60T 13/14* (2006.01)
*B60T 8/40* (2006.01)
*F16H 25/20* (2006.01)

(52) U.S. Cl.
CPC ........ *F16H 25/2204* (2013.01); *B60T 8/4018* (2013.01); *B60T 8/4022* (2013.01); *B60T 8/4081* (2013.01); *B60T 8/4086* (2013.01); *F16H 25/2015* (2013.01); *F16H 2025/2075* (2013.01)

(58) Field of Classification Search
CPC ...... B60T 13/686; B60T 13/741; B60T 13/74; G01D 11/30; F16H 25/2015
USPC ...................................... 74/89.23; 303/115.2
See application file for complete search history.

(56) References Cited

U.S. PATENT DOCUMENTS

| | | | | |
|---|---|---|---|---|
| 8,038,229 | B2* | 10/2011 | Leiber | B60T 8/4077 303/114.1 |
| 9,096,203 | B2* | 8/2015 | Kim | B60T 11/16 |
| 9,868,423 | B2* | 1/2018 | Weh | F04B 9/047 |
| 10,549,737 | B2* | 2/2020 | Leiber | B60T 13/745 |
| 2004/0075339 | A1* | 4/2004 | Volz | B60T 8/368 303/116.4 |
| 2012/0160043 | A1* | 6/2012 | Drumm | F16H 25/20 74/89.23 |
| 2012/0167565 | A1 | 7/2012 | Richard et al. | |
| 2012/0324882 | A1* | 12/2012 | Mori | B60T 13/745 60/545 |
| 2014/0216866 | A1† | 8/2014 | Feigel | |
| 2018/0065609 | A1* | 3/2018 | Leiber | B60T 8/368 |
| 2019/0061726 | A1* | 2/2019 | Leiber | B60T 8/4077 |
| 2019/0100189 | A1* | 4/2019 | Ganzel | B60T 13/745 |

FOREIGN PATENT DOCUMENTS

CN 105221614 1/2016
WO 2015144160 A1 † 10/2015

\* cited by examiner
† cited by third party

ACTUATOR ASSEMBLY FOR INTEGRATED DYNAMIC BRAKE APPARATUS

CROSS-REFERENCE TO RELATED APPLICATION

This application claims priority to and the benefit of Korean Patent Application No. 10-2016-0085691, filed on Jul. 6, 2016, the disclosure of which is incorporated herein by reference in its entirety.

BACKGROUND

1. Field of the Invention

The present invention relates to an actuator assembly, and more particularly, to an actuator assembly for an integrated dynamic brake apparatus.

2. Discussion of Related Art

In recent years, the development of a hybrid vehicle, a fuel cell vehicle, an electric vehicle, and the like has been vigorously carried out in order to improve fuel efficiency and reduce exhaust gas.

In such a vehicle, it is essential that a brake system, i.e. a vehicular brake apparatus, is installed. Here, the vehicular brake apparatus refers to an apparatus that serves to stop or reduce the speed of a traveling vehicle.

A general vehicular brake apparatus includes a vacuum brake using suction pressure of an engine to generate a braking force and a hydraulic brake that uses hydraulic pressure to generate a braking force.

Meanwhile, an electro-hydraulic brake system which is one type of hydraulic brake is a brake system in which an electronic control unit detects a driver stepping on a pedal and transmits hydraulic pressure, i.e. brake hydraulic pressure, to a wheel cylinder (not shown) of each wheel and generates a braking force.

An example related to the electro-hydraulic brake system is also disclosed in detail in "Brake System having Electric Servo-Brake" of U.S. Patent Publication No. 2012-0167565.

The conventional electro-hydraulic brake system disclosed in the above patent configured as above uses two worm wheels to which a pinion gear and a worm gear are coupled interlocking at both sides of the rack gear to secure linearity of the rack gear that pushes a piston in a pump in order to generate braking pressure, there are problems in which the size of the rack gear driving apparatus part is enlarged and the weight thereof also is significantly increased. Thus, problems of reducing the mountability of the electro-hydraulic brake system within a vehicle and hindering a lay-out design occur.

Furthermore, since the conventional electro-hydraulic brake system has an anti-lock brake system (ABS) module and an electronic stability control (ESC) module for implementing functions of the ABS and the ESC independently installed, and has an electronic control unit (ECU) for controlling a position of a motor and an ECU for controlling a solenoid valve separately installed, the size and the weight of the overall brake system increase, thus causing problems of increasing the manufacturing cost and reducing the mountability of the brake system within a vehicle.

PRIOR ART DOCUMENT

Patent Document

U.S. Patent Application Publication No. 2012/0167565

SUMMARY OF THE INVENTION

The present invention is directed to providing an actuator assembly for an integrated dynamic brake apparatus which configures a motor, a block, a gear unit, a piston, and an electronic control unit, and the like as one module, thereby minimizing the weight and the volume of the integrated dynamic brake apparatus.

The objectives of the present invention are not limited to those mentioned above, and other unmentioned objectives will be apparently understood from the description below by those of ordinary skill in the art.

According to an embodiment of the present invention, there is provided an actuator assembly for an integrated dynamic brake apparatus that includes a motor in which a first hollow is formed and having a stator and a rotor spaced apart from an inner circumferential surface of the stator to be disposed in the first hollow, a block having one side coupled to one side of the motor and in which a second hollow communicating with the first hollow is formed; a gear unit having one side coupled and fixed to the rotor to convert rotational movement of the rotor to linear movement; a piston to receive the converted linear movement from the gear unit to linearly reciprocate between the first hollow and the second hollow, an electronic control unit coupled to the other side of the block and including a motor position sensor to detect a position of the motor, and a sensing magnet holder having one side coupled to the other side of the gear unit to rotate along with the gear unit based on the rotation of the gear unit and having a sensing magnet inserted into the other side thereof, wherein the motor position sensor detects the position of the motor based on rotation of the sensing magnet.

It is preferable that the rotor has a groove formed therein, and the one side of the gear unit is inserted into the groove to be coupled to the stator in order to rotate along with rotation of the stator.

It is preferable that at least one magnetic body is disposed at an outer circumferential surface of the rotor, and the at least one magnetic body is disposed to be spaced apart from the inner circumferential surface of the stator.

It is preferable that the motor position sensor is disposed at a position corresponding to the sensing magnet.

It is preferable a screw thread is formed on an outer circumferential surface of one side of the gear unit and a screw groove corresponding to the screw thread is formed in an inner circumferential surface of one side of the piston such that the piston is ball-screw coupled to the gear unit.

It is preferable that the actuator assembly for an integrated dynamic brake apparatus further includes a guide member disposed between the rotor and the piston and having one portion fixed and coupled to the block.

It is preferable that the actuator assembly for an integrated dynamic brake apparatus further includes a sleeve disposed at an outer circumferential surface of the sensing magnet holder, and the inner circumferential surface of the other side of the piston linearly reciprocates along the outer circumferential surface of the sleeve.

It is preferable that the actuator assembly for an integrated dynamic brake apparatus further includes a first sealing member disposed at a portion in which the inner circumferential surface of the piston and the outer circumferential surface of the sleeve come in contact.

It is preferable that the actuator assembly for an integrated dynamic brake apparatus further includes a second sealing member disposed at a portion in which the outer circumferential surface of the piston and the block come in contact.

It is preferable that the actuator assembly for an integrated dynamic brake apparatus further includes a third sealing member disposed at a portion in which the outer circumferential surface of the piston and the inner circumferential surface of the guide member come in contact.

It is preferable that the actuator assembly for an integrated dynamic brake apparatus further includes a first piston unit is ball-screw coupled to the gear unit by the screw thread being formed on the outer circumferential surface of the gear unit and the screw groove corresponding to the screw thread being formed in the inner circumferential of the piston, and a second piston unit having one side supported by the first piston unit to linearly move based on linear movement of the first piston unit.

It is preferable that the actuator assembly for an integrated dynamic brake apparatus further includes a sleeve disposed at an outer circumferential surface of the sensing magnet holder and a sleeve housing disposed at the inner circumferential surface of the block.

It is preferable that the other side of the second piston unit linearly reciprocates along a portion between the sleeve and the sleeve housing.

It is preferable that the actuator assembly for an integrated dynamic brake apparatus further includes a fourth sealing member disposed at a portion of the second piston unit coming in contact with the sleeve.

It is preferable that the actuator assembly for an integrated dynamic brake apparatus further includes a fifth sealing member disposed at a portion of the second piston unit coming in contact with the sleeve housing.

It is preferable that the actuator assembly for an integrated dynamic brake apparatus further includes a sixth sealing member disposed at a portion of the sleeve housing coming in contact with the second piston unit.

It is preferable that the actuator assembly for an integrated dynamic brake apparatus further includes a seventh sealing member disposed at a portion in which the block and the sleeve housing come in contact.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
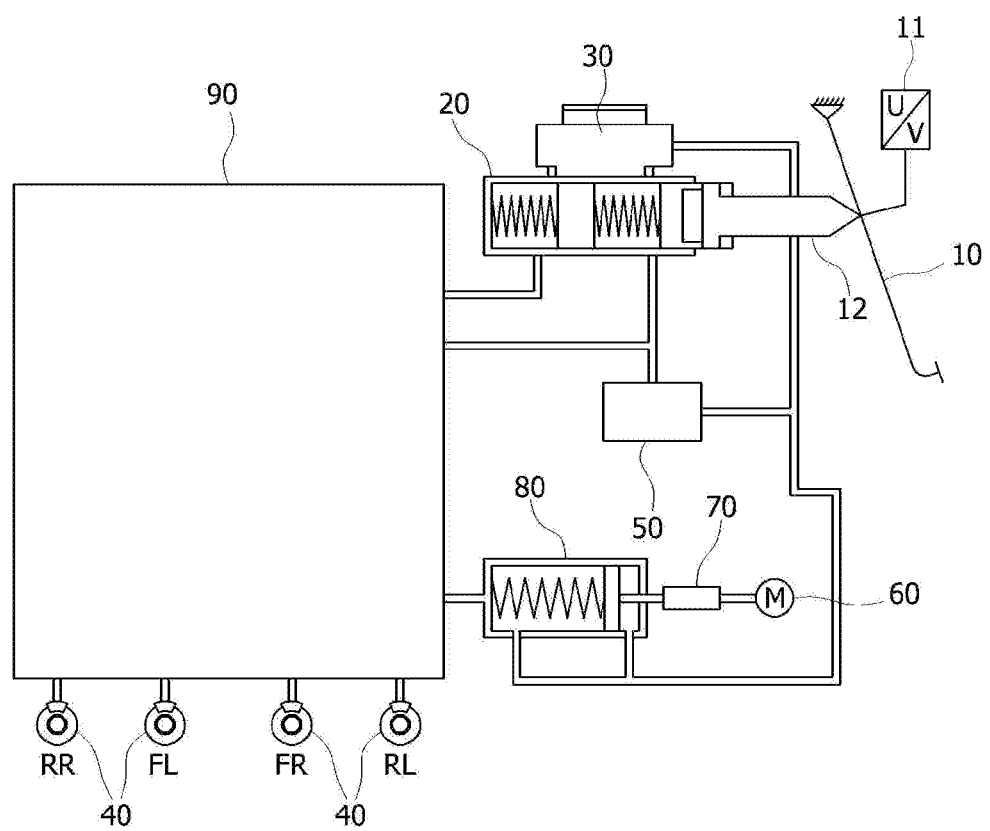
FIG. 1 is a view schematically illustrating an integrated dynamic brake apparatus.

Hereinafter, preferred embodiments of the present invention will be described in detail with reference to the accompanying drawings, like reference numerals will be given to the same or similar elements throughout the drawings and the overlapping description thereof will be omitted.

In addition, when detailed description of a known related art is deemed to obscure the gist of the present invention in describing the present invention, the detailed description thereof will be omitted. Also, the accompanying drawings are merely for easily understanding the spirit of the present invention, and it should be noted that the spirit of the present invention should not be construed as being limited by the accompanying drawings.

Figure 2:
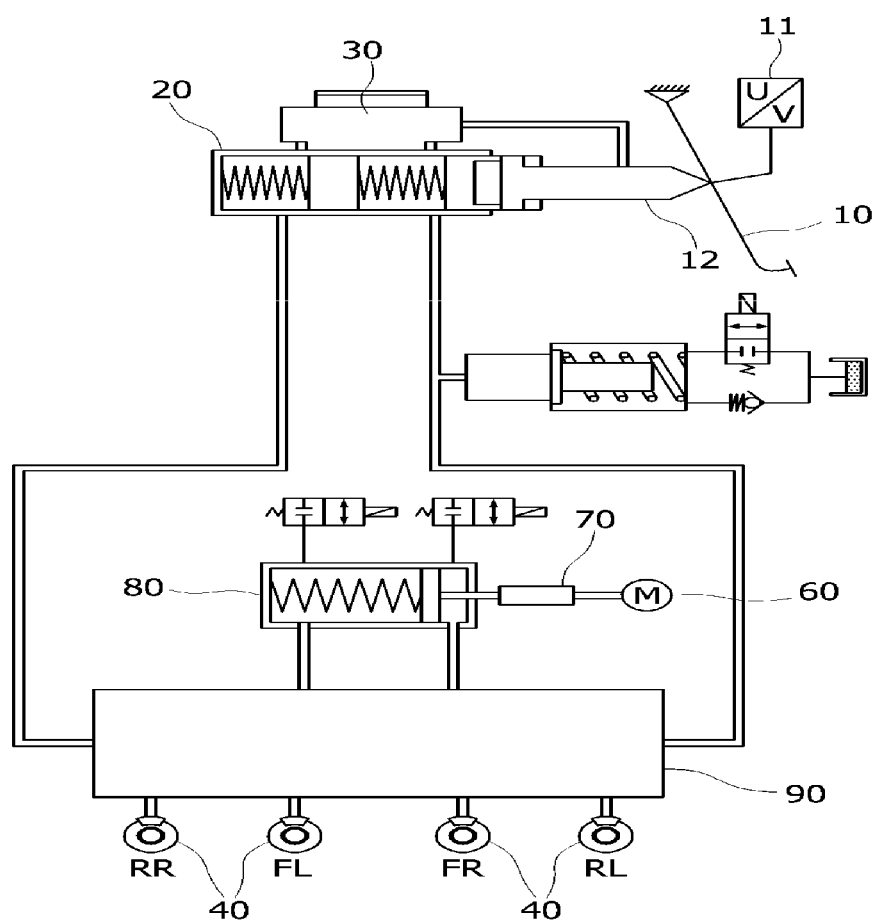
FIG. 2 is a view schematically illustrating another type of an integrated dynamic brake apparatus.

Prior to describing an actuator assembly for an integrated dynamic brake apparatus, the integrated dynamic brake apparatus will be first described with reference to FIG. 1 and FIG. 2. FIG. 1 is a view schematically illustrating an integrated dynamic brake apparatus. FIG. 2 is a view schematically illustrating another type of an integrated dynamic brake apparatus;

As illustrated in FIGS. 1 and 2, an integrated dynamic brake apparatus includes a master cylinder 20, a reservoir 30, a wheel cylinder 40, a pedal simulator 50, a motor 60, a gear unit 70, and a pump 80.

The master cylinder 20 serves to generate fluid pressure by being pressed by an input rod 12 when a driver operates a brake pedal 10, the generated fluid pressure is transmitted to the pedal simulator 50, and the pedal simulator 50 transmits a reaction force corresponding to the fluid pressure back to the brake pedal 10 via the master cylinder 20, such that a driver is allowed to sense the feel of a pedal. Also, when an emergency such as electric power not being supplied to the whole system, occurs, a vehicle may be braked by the fluid pressure of the master cylinder 20 immediately being transmitted toward the wheel cylinder 40.

Meanwhile, in a normal state, the pump 80 transmits fluid toward the wheel cylinder. Specifically, when a driver presses the brake pedal 10, a stroke sensor 11 detects a displacement of the brake pedal 10 and transmits the displacement of the brake pedal 10 to an electronic control unit. Then, the electronic control unit drives the motor 60 based on the displacement of the brake pedal 10. When rotational movement generated by the motor 60 is converted to linear reciprocating movement by the gear unit 70 to press a piston in the pump 80, fluid accommodated in a chamber of the pump 80 moves toward the wheel cylinder 40.

The reservoir 30 is a means for storing fluid and is configured to fluidically communicate with the master cylinder 20, the pedal simulator 50, and the pump 80. Also, a hydraulic pressure circuit unit 90 includes a flow passage for transferring fluid between the master cylinder 20, the pump 80, and the wheel cylinder 40, and valves for regulating the flow of the fluid within the flow passage, and detailed description thereof will be omitted.

Figure 3:
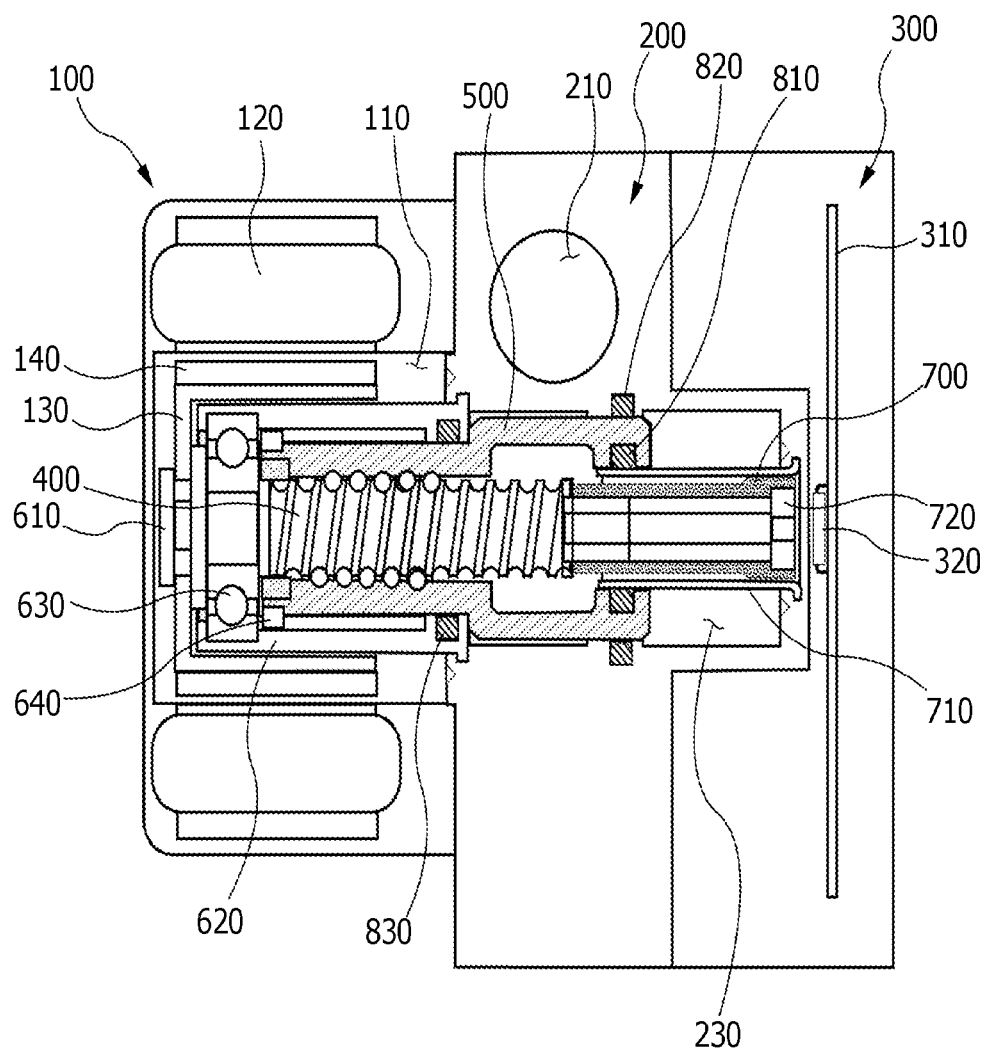
FIG. 3 is a cross-sectional view of an actuator assembly for an integrated dynamic brake apparatus according to an embodiment of the present invention.

Hereinafter, an actuator assembly for an integrated dynamic brake apparatus according to an embodiment of the present invention will be described with reference to FIG. 3. FIG. 3 is a cross-sectional view of an actuator assembly for an integrated dynamic brake apparatus according to an embodiment of the present invention.

As illustrated in FIG. 3, the actuator assembly for an integrated dynamic brake apparatus according to an embodiment of the present invention is configured to include a motor 100, a block 200, an electronic control unit 300, a gear unit 400, and a piston 500.

The motor 100 serves to generate a rotary force by power supply, includes a stator 120 and a rotor 130, has a first hollow 110 formed therein as illustrated in FIG. 3, and the rotor 130 is disposed in the first hollow 110. At least one magnetic body 140 to generate the rotary force in the motor 100 is disposed at an outer circumferential surface of the rotor 130, and a gap should be formed between the at least one magnetic body 140 and the stator 120 for the rotor 130 to rotate without being interfered with. A groove is formed in the rotor 130 as illustrated in FIG. 3 such that the cross-section of the rotor 130 has a C-shaped structure.

The block 200 has a flow passage and a plurality of solenoid valves formed therein, has one side coupled to the motor 100, has a second hollow 230 communicating with the first hollow 110 of the motor 100, and specifically, the second hollow 230 serves as a chamber that accommodates fluid. Also, a hollow 210 perpendicular to the second hollow 230 may be additionally formed in the block 200, and at least one of the master cylinder and the input rod is inserted into the hollow 210, thereby minimizing the size of the integrated dynamic brake apparatus.

The electronic control unit 300 is configured to be coupled to the other side of the block 200, has a printed circuit board 310, on which electronic devices for controlling the motor 100 and the solenoid valves, etc. are mounted, embedded therein, and furthermore, the printed circuit board 310 includes a motor position sensor 320 to detect a position of the motor 100.

The gear unit 400 is configured to be disposed throughout the first hollow 110 and the second hollow 230, serves to convert the rotational movement of the rotor 130 to linear movement, and the piston 500 also receives the converted linear movement from the gear unit 400 to linearly reciprocate between the first hollow 110 and the second hollow 230. Specifically, a screw thread is formed on the outer circumferential surface of one side of the gear unit 400 and a screw groove corresponding to the screw thread is formed in the inner circumferential surface of one side of the piston 500 such that the piston 500 is ball-screw coupled to the gear unit 400 and the piston 500 may linearly reciprocate between the first hollow 110 and the second hollow 230.

Meanwhile, one side of the gear unit 400 is fixed and coupled to the rotor 130 to rotate along with the rotor 130 based on the rotation of the rotor 130. Specifically, as illustrated in FIG. 3, the rotor 130 and the gear unit 400 may be coupled using a separate pin member 610. Holes into which the pin member 610 may be inserted have to be formed in the rotor 130 and the gear unit 400 for the rotor 130 and the gear unit 400 to be coupled by the pin member 610, and it is preferable that cross-sections of the pin member 610 and the holes are formed in a polygonal shape instead of a circular shape to prevent the slipping of the rotor 130 and the gear unit 400.

In addition, the actuator assembly for an integrated dynamic brake apparatus should include a guide member 620 for supporting the piston 500. As illustrated in FIG. 3, the guide member 620 is disposed between the rotor 130 and the piston 500, should be disposed by being spaced apart from the rotor 130 to not rotate along with the rotation of the rotor 130, and a portion of the guide member 620 has to be fixed and coupled to the block 200. Meanwhile, to prevent the piston 500 from rotating along with the rotation of the gear unit 400, it is preferable that a longitudinal guide groove is formed in the guide member 620 and a rotation prevention member 640 inserted into the guide groove is formed at the outer circumferential surface of the piston 500.

The gear unit 400 is also coupled to the guide member 620. The guide member 620 and the gear unit 400 are coupled by a bearing 630 such that the gear unit 400 may rotate based on the rotation of the rotor 130 despite fixing of the guide member 620.

Meanwhile, one side of the gear unit 400 of the actuator assembly for an integrated dynamic brake apparatus is fixed and coupled to the rotor 130 as mentioned above, and the other side thereof is coupled to one side of a sensing magnet holder 700. When describing the coupling between the gear unit 400 and the sensing magnet holder 700 in detail, a coupling protrusion is formed at the other side of the gear unit 400, a coupling groove corresponding to the coupling protrusion is formed in one side of the sensing magnet holder 700, and the coupling protrusion is inserted into the coupling groove to couple the gear unit 400 to the sensing magnet holder 700. Since the sensing magnet holder 700 has to rotate along with the rotation of the gear unit 400, it is preferable that cross-sections of the coupling protrusion and the coupling groove are formed in a polygonal shape instead of a circular shape.

A sensing magnet 720 is inserted into and coupled to the other side of the sensing magnet holder 700, i.e. a side of the sensing magnet holder 700 adjacent to the electronic control unit 300, and the motor position sensor 320 may detect a rotation position of the motor 100 based on a change in magnetic flux due to the rotation of the sensing magnet 720. The motor position sensor 320 is mounted on the printed circuit board 310 disposed in the electronic control unit 300 while being disposed at a position corresponding to the sensing magnet 720, i.e. a position at which a rotation axis of the sensing magnet 720 and a center of the motor position sensor 320 are concentric, in order to further improve a detecting ability of the motor position sensor 320. Also, a sleeve 710 is disposed at an outer circumferential surface of the sensing magnet holder 700, and the inner circumferential surface at the other side of the piston 500 linearly reciprocates along the outer circumferential surface of the sleeve 710.

Meanwhile, since the second hollow 230 of the block 200 serves as a chamber that accommodates fluid, it is preferable that the actuator assembly for an integrated dynamic brake apparatus further includes sealing members to prevent fluid from leaking to the outside. Specifically, it is preferable that the actuator assembly for an integrated dynamic brake apparatus includes a first sealing member 810 disposed at a portion in which the inner circumferential surface of the piston 500 and the outer circumferential surface of the sleeve 710 come in contact, a second sealing member 820 disposed at a portion in which the outer circumferential surface of the piston 500 and the block 200 come in contact, and a third sealing member 830 disposed at a portion in which the outer circumferential surface of the piston 500 and the inner circumferential surface of the guide member 620 come in contact.

Figure 4:
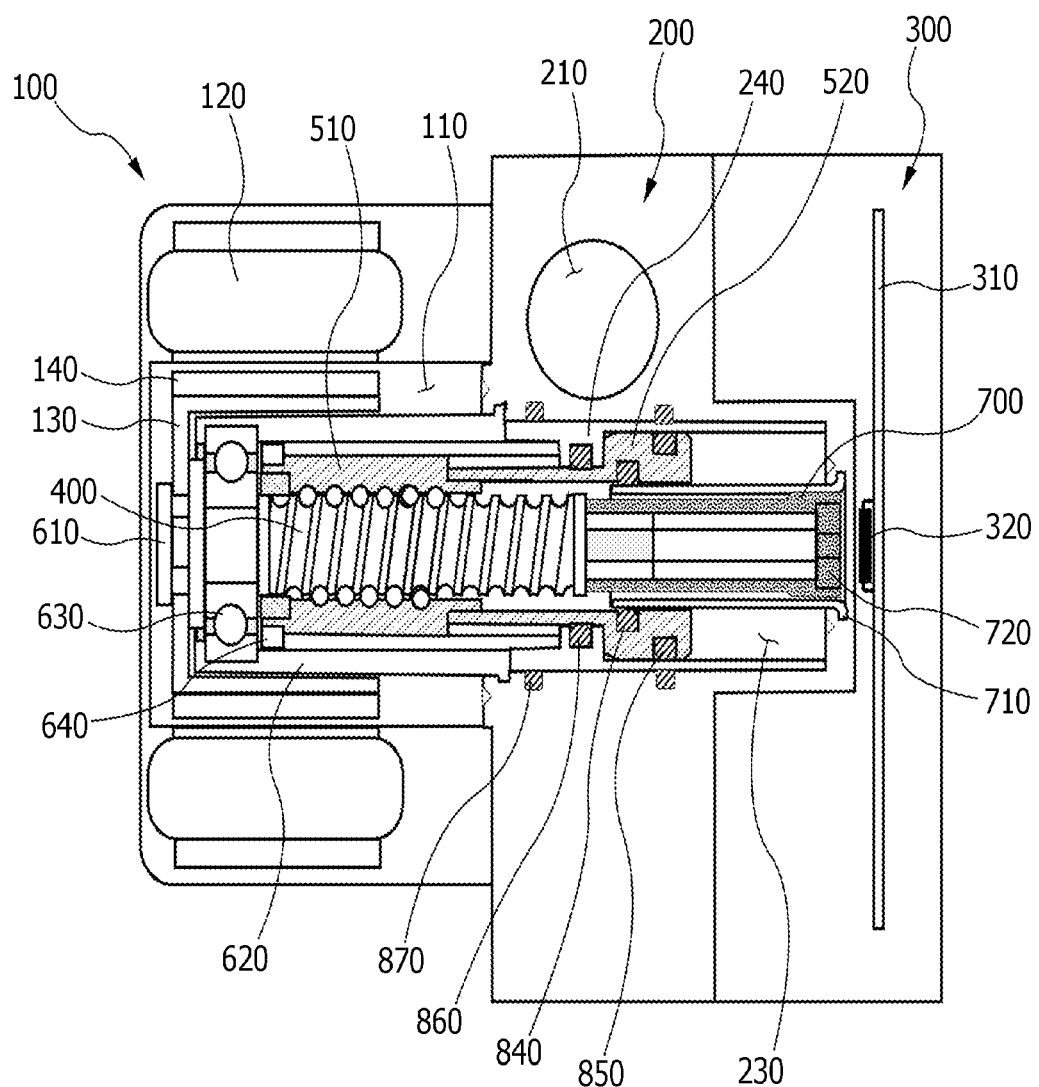
FIG. 4 is a cross-sectional view of an actuator assembly for an integrated dynamic brake apparatus according to another embodiment of the present invention.

Hereinafter, an actuator assembly for an integrated dynamic brake apparatus according to another embodiment of the present invention will be described while detailed description of parts overlapping with the actuator assembly for an integrated dynamic brake apparatus according to the previous embodiment of the present invention will be omitted. FIG. 4 is a cross-sectional view of an actuator assembly for an integrated dynamic brake apparatus according to another embodiment of the present invention.

As illustrated in FIG. 4, the actuator assembly for an integrated dynamic brake apparatus according to another embodiment of the present invention is configured to include the motor 100, the block 200, the electronic control unit 300, the gear unit 400, and the piston 500 and also includes the sensing magnet holder 700 and the sensing magnet 720, but since the elements are the same as in the actuator assembly for an integrated dynamic brake apparatus according to the previous embodiment of the present invention, the detailed description thereof will be omitted.

A difference between the actuator assembly for an integrated dynamic brake apparatus according to another embodiment of the present invention and the actuator assembly for an integrated dynamic brake apparatus according to the previous embodiment of the present invention is that, in the actuator assembly for an integrated dynamic brake apparatus according to another embodiment of the present invention, the piston 500 is separated into a first piston unit 510 and a second piston unit 520 as illustrated in FIG. 4. Specifically, the first piston unit 510 is configured to be ball-screw coupled to the gear unit 400 using the screw groove corresponding to the screw thread formed on the outer circumferential surface of the gear unit 400 formed in the inner circumferential surface thereof. The second piston unit 520 is configured to linearly move based on the linear movement of the first piston unit 510 by being supported by the first piston unit 510.

Meanwhile, the actuator assembly for an integrated dynamic brake apparatus according to another embodiment of the present invention includes the sleeve 710 disposed at the sensing magnet holder 700 and a sleeve housing 240 disposed at the inner circumferential surface of the block 200. As illustrated in FIG. 4, it is preferable that one side of the sleeve housing 240 is disposed between the rotor 130 and the piston 500 and is disposed to abut the guide member 620 having a portion fixed and coupled to the block 200. The other side of the second piston unit 520 linearly reciprocates along a portion between the sleeve 710 and the sleeve housing 240.

Generally, the block 200 and the piston 500 are formed with metallic materials. When the piston 500 reciprocates to abut the inner circumferential surface of the block 200, fine metal particles may be introduced toward the chamber due to friction between the metal materials, and moreover, there is a problem of generating noise due to the friction. Consequently, when the sleeve housing 240 formed with a plastic material is disposed between the block 200 and the piston 500, the above problem may be solved.

Furthermore, since the second hollow 230 of the block 200 serves as a function that accommodates fluid, it is preferable that the actuator assembly for an integrated dynamic brake apparatus according to another embodiment of the present invention further includes sealing members to prevent the fluid from leaking to the outside. Specifically, it is preferable that the actuator assembly for an integrated dynamic brake apparatus according to another embodiment of the present invention includes a fourth sealing member 840 disposed at a portion of the second piston unit 520 coming in contact with the sleeve 710, a fifth sealing member 850 disposed at a portion of the second piston unit 520 coming in contact with the sleeve housing 240, a sixth sealing member 860 disposed at a portion of the sleeve housing 240 coming in contact with the second piston unit 520, and a seventh sealing member 870 disposed at a portion in which the block 200 and the sleeve housing 240 come in contact.

According to an embodiment of the present invention, the actuator assembly for an integrated dynamic brake apparatus couples a motor in which a hollow is formed, a block coupled to the motor while having a plurality of valves therein, and an electronic control unit while configuring a gear unit and a piston to be accommodated in the motor and the block, thereby minimizing the weight and the volume of the integrated dynamic brake apparatus.

In addition, the actuator assembly for an integrated dynamic brake apparatus has a sensing magnet for detecting a position of the motor mounted on an end of the gear unit and has a motor position sensor disposed at a position corresponding to the sensing magnet in an electronic control unit, thereby simultaneously improving a detecting ability of the motor position sensor and reducing the size of the integrated dynamic brake apparatus by efficient space utilization.

The effects of the present invention are not limited to those mentioned above, and other unmentioned effects will be apparently understood from the description below by those of ordinary skill in the art.

The embodiments described herein and the accompanying drawings merely describe a part of the technical spirit included in the present invention exemplarily. Consequently, since the embodiments disclosed herein are not for limiting the technical spirit of the present invention but for describing the same, it is clear that the scope of the technical spirit of the present invention is not limited by the embodiments. Modified embodiments and detailed embodiments that may be easily inferred by those of ordinary skill in the art within the scope of the technical spirit included in the specification and the drawings of the present invention should all be construed as being included in the scope of the present invention.

What is claimed is:

1. An actuator assembly for an integrated dynamic brake apparatus, the actuator assembly comprising:
a hollow motor having a stator and a rotor spaced apart from an inner circumferential surface of the stator;
a block having one side coupled to one side of the motor, wherein a chamber configured to accommodate fluid is formed in the block;
a gear unit having one side coupled to the rotor to convert rotational movement of the rotor to linear movement;
a piston configured to be linearly movable by the converted linear movement from the gear unit;
an electronic control unit coupled to the other side of the block and comprising a motor position sensor configured to detect a position of the motor; and
a sensing magnet holder disposed between the gear unit, which converts the rotational movement of the rotor to the linear movement, and the electronic control unit, wherein a sensing magnet is coupled to the sensing magnet holder,
wherein the sensing magnet holder is configured to be rotatable coaxially with the rotor of the motor.

2. The actuator assembly of claim 1, wherein:
the sensing magnet holder has one side coupled to an other side of the gear unit to rotate along with the gear unit based on the rotation of the gear unit,
the sensing magnet is coupled to an other side of the sensing magnet holder,
the motor position sensor detects the position of the motor based on rotation of the sensing magnet.

3. The actuator assembly of claim 1, wherein:
a first hollow is formed in the motor, and a second hollow is formed to fluidly communicate with the first hollow in the block, and
the piston configured to linearly reciprocate between the first hollow and the second hollow.

4. The actuator assembly of claim 1, wherein the motor position sensor is disposed at a position corresponding to the sensing magnet.

5. The actuator assembly of claim 1, wherein a screw thread is formed on an outer circumferential surface of one side of the gear unit and a screw groove corresponding to the screw thread is formed in an inner circumferential surface of one side of the piston such that the piston is ball-screw coupled to the gear unit.

6. The actuator assembly of claim 5, further comprising a guide member disposed between the rotor and the piston and having one portion fixed and coupled to the block.

7. The actuator assembly of claim 1, further comprising a sleeve disposed at an outer circumferential surface of the sensing magnet holder,
wherein an inner circumferential surface of the piston linearly reciprocates along the outer circumferential surface of the sleeve.

8. The actuator assembly of claim 1, wherein a screw thread is formed on an outer circumferential surface of the gear unit, and the piston comprises:
a first piston unit is ball-screw coupled to the gear unit by a screw groove corresponding to the screw thread being formed in the inner circumferential thereof; and
a second piston unit having one side supported by the first piston unit to linearly move based on linear movement of the first piston unit.

9. The actuator assembly of claim 8, further comprising:
a sleeve disposed at an outer circumferential surface of the sensing magnet holder; and
a sleeve housing disposed at the inner circumferential surface of the block;
wherein the other side of the second piston unit linearly reciprocates along a portion between the sleeve and the sleeve housing.

10. The actuator assembly of claim 1, wherein the motor position sensor is positioned between the block and a circuit board comprised in the electronic control unit.

11. The actuator assembly of claim 1, wherein the motor position sensor is mounted on a circuit board comprised in the electronic control unit coupled to the other side of the block.

12. The actuator assembly of claim 1, wherein the motor position sensor is disposed on a surface of a circuit board facing the other side of the block.

13. The actuator assembly of claim 1, wherein the block comprises a hollow, wherein a master cylinder is disposed in the hollow which is disposed perpendicular to the piston.

14. The actuator assembly of claim 1, wherein the gear unit fixedly couples the rotor of the motor to the sensing magnet holder.

15. An actuator assembly for an integrated dynamic brake apparatus, the actuator assembly comprising:
a hollow motor having a stator and a rotor spaced apart from an inner circumferential surface of the stator;
a block having one side coupled to one side of the motor, wherein a chamber configured to accommodate fluid is formed in the block;
a gear unit having one side coupled to the rotor to convert rotational movement of the rotor to linear movement;
a piston configured to be linearly movable by the converted linear movement from the gear unit;
an electronic control unit coupled to the other side of the block and comprising a motor position sensor configured to detect a position of the motor; and
a sensing magnet holder disposed between the gear unit, which converts the rotational movement of the rotor to the linear movement, and the electronic control unit, wherein the gear unit fixedly couples the rotor of the motor to the sensing magnet holder, and a sensing magnet is coupled to the sensing magnet holder,
wherein the sensing magnet holder is configured to be rotatable coaxially with the rotor of the motor.

16. An actuator assembly for an integrated dynamic brake apparatus, the actuator assembly comprising:
a hollow motor having a stator and a rotor spaced apart from an inner circumferential surface of the stator;
a block having one side coupled to one side of the motor, wherein a chamber configured to accommodate fluid is formed in the block;
a gear unit having one side coupled to the rotor to convert rotational movement of the rotor to linear movement;
a piston configured to be linearly movable by the converted linear movement from the gear unit;
an electronic control unit coupled to the other side of the block and comprising a motor position sensor configured to detect a position of the motor;
a sensing magnet holder disposed between the gear unit, which converts the rotational movement of the rotor to the linear movement, and the electronic control unit, wherein a sensing magnet is coupled to the sensing magnet holder; and
a sleeve disposed at an outer circumferential surface of the sensing magnet holder,
wherein an inner circumferential surface of the piston linearly reciprocates along the outer circumferential surface of the sleeve.

17. The actuator assembly of claim 16, further comprising a first sealing member disposed at a portion in which the inner circumferential surface of the piston and the outer circumferential surface of the sleeve come in contact.

* * * * *